(12) United States Patent
Alili et al.

(10) Patent No.: US 11,273,814 B2
(45) Date of Patent: Mar. 15, 2022

(54) HYDRAULIC BLOCK OF AN ELECTROHYDRAULIC POWER-ASSISTED BRAKE

(71) Applicant: Robert Bosch GmbH, Stuttgart (DE)

(72) Inventors: Amine Alili, Gasny (FR); Mickenson Jean Louis, Dammartin-en-Goële (FR)

(73) Assignee: Robert Bosch GmbH, Stuttgart (DE)

( * ) Notice: Subject to any disclaimer, the term of this patent is extended or adjusted under 35 U.S.C. 154(b) by 209 days.

(21) Appl. No.: 16/648,575

(22) PCT Filed: Aug. 10, 2018

(86) PCT No.: PCT/EP2018/071741
§ 371 (c)(1),
(2) Date: Mar. 18, 2020

(87) PCT Pub. No.: WO2019/072441
PCT Pub. Date: Apr. 18, 2019

(65) Prior Publication Data
US 2020/0216049 A1    Jul. 9, 2020

(30) Foreign Application Priority Data
Oct. 12, 2017    (FR) ...................................... 1759579

(51) Int. Cl.
*B60T 11/22*    (2006.01)
*B60T 11/26*    (2006.01)
*B60T 13/74*    (2006.01)

(52) U.S. Cl.
CPC ............... *B60T 11/22* (2013.01); *B60T 11/26* (2013.01); *B60T 13/745* (2013.01)

(58) Field of Classification Search
CPC ......... B60T 11/22; B60T 11/26; B60T 13/745
(Continued)

(56) References Cited

U.S. PATENT DOCUMENTS

| 4,827,720 A | 5/1989 | Flynn et al. |
| 9,981,641 B2 * | 5/2018 | Nakamura ............ B60T 13/686 |

(Continued)

FOREIGN PATENT DOCUMENTS

| CN | 103221286 A | 7/2013 |
| DE | 4242212 A1 | 6/1994 |

(Continued)

OTHER PUBLICATIONS

Machine Translation of JP2001-030892.*
International Search Report for PCT/EP2018/071741, dated Sep. 21, 2018.

*Primary Examiner* — Michael Leslie
*Assistant Examiner* — Daniel S Collins
(74) *Attorney, Agent, or Firm* — Norton Rose Fulbright US LLP; Gerard Messina

(57) ABSTRACT

A hydraulic block, the upper side of which is provided with a brake-fluid reservoir which is fixed in place on the front surface and on the rear surface of the block by fastening apparatus/device (arrangement). The front fastening apparatus/device (arrangement) is formed by a tab that projects from the underside of the reservoir, this tab being screwed to the front surface of the block. The rear fastening apparatus/device (arrangement) is made up of a tab, which projects from the rear side of the reservoir and is formed by a hook that is supported by a carrier that is fastened to the rear side of the hydraulic block and forms a support for the tab, as well as a clamp, which connects the tab to the hook.

9 Claims, 7 Drawing Sheets

(58) Field of Classification Search
USPC .......................................................... 60/585
See application file for complete search history.

(56) References Cited

U.S. PATENT DOCUMENTS

| | | | |
|---|---|---|---|
| 2010/0287930 A1 | 11/2010 | Lenczner et al. | |
| 2015/0275926 A1* | 10/2015 | Kobori | B60T 11/26 220/562 |
| 2015/0360670 A1 | 12/2015 | Lange | |

FOREIGN PATENT DOCUMENTS

| | | | | |
|---|---|---|---|---|
| DE | 102007049913 A1 | 4/2009 | | |
| EP | 0104103 A1 | 3/1984 | | |
| EP | 1190923 A2 | 3/2002 | | |
| FR | 2844333 A1 | 3/2004 | | |
| JP | 2001030892 | * | 2/2001 | ............. B60T 11/22 |
| WO | 9812087 A1 | 3/1998 | | |

\* cited by examiner

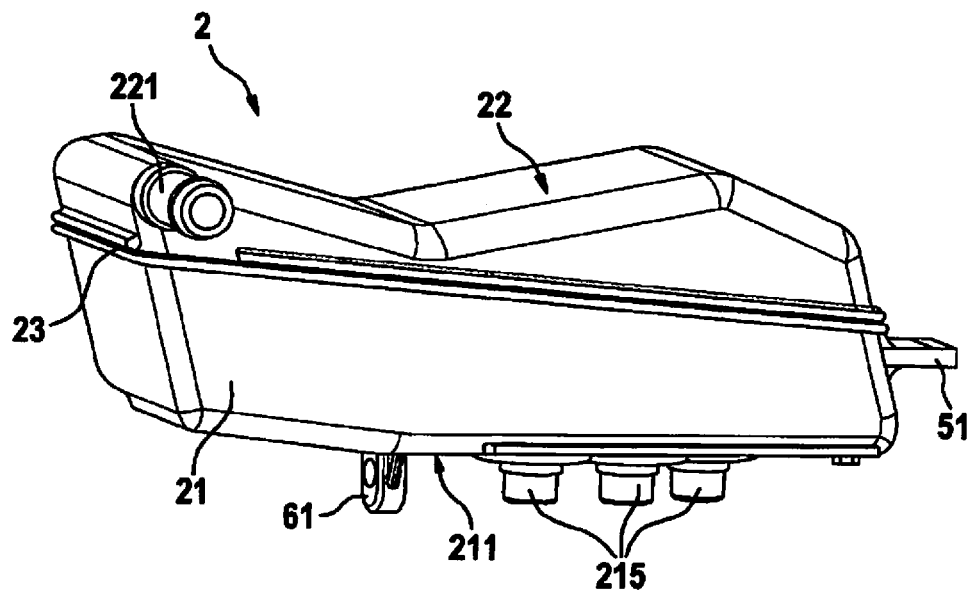
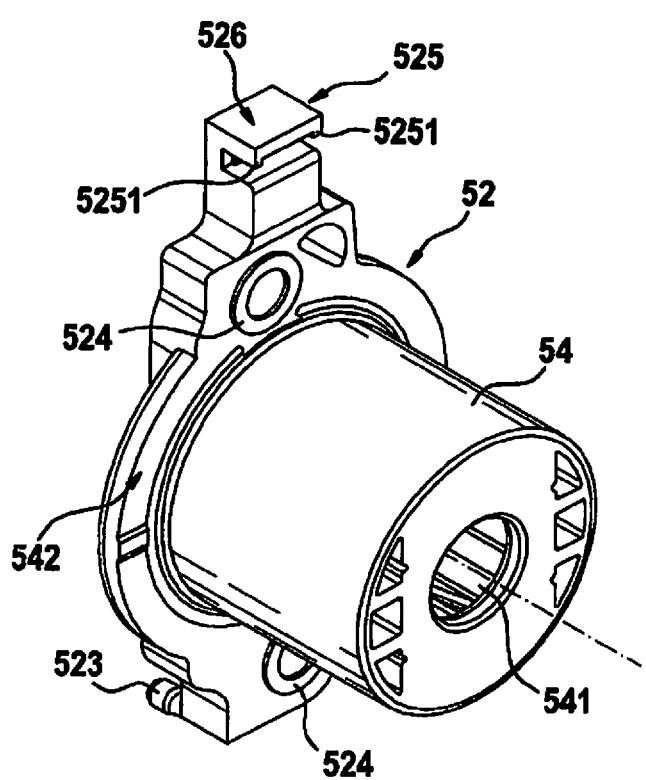
Fig. 4
Fig. 5A

HYDRAULIC BLOCK OF AN ELECTROHYDRAULIC POWER-ASSISTED BRAKE

FIELD OF THE INVENTION

The present invention relates to a hydraulic block of an electrohydraulic power-assisted brake, the upper side of which is provided with a brake-fluid reservoir, which is fixed in place on the front surface and the rear surface of the hydraulic block in a removable manner with the aid of a front fastening apparatus/device (arrangement) and a rear fastening apparatus/device (arrangement).

BACKGROUND INFORMATION

Such hydraulic blocks are already believed to be available. One of the difficulties with these hydraulic blocks is the installation of the brake-fluid reservoir, which must be easily removable for interventions at the reservoir while limited space is available to reach the attachment of the reservoir.

In addition, the reservoir has to be connected to the hydraulic block by tight connections between the connector of the reservoir and the supply connections of the hydraulic block.

SUMMARY OF THE INVENTION

The present invention has the object of providing a hydraulic block of an electrohydraulic power-assisted brake, which is provided with an apparatus/device (arrangement) that allows for a simple, removable attachment of the brake-fluid reservoir in order to facilitate access to the installation and assembly apparatus/device (arrangement) of the reservoir on the hydraulic block.

In addition, the present invention has the object of facilitating the installation of the hydraulic block on the splash wall of the vehicle, which separates the engine compartment in which the hydraulic block is accommodated from the side of the passenger compartment in which the brake pedal that is connected to the hydraulic block by the control rod is located.

Toward this end, the present invention has as its subject matter a hydraulic block of an electrohydraulic power-assisted brake of the type defined in the previous text, which is characterized in that the front fastening apparatus/device (arrangement) is formed by a tab that projects from the underside of the brake-fluid reservoir, this tab being fastened to the front surface of the hydraulic block by a screw, and the rear fastening apparatus/device (arrangement) is formed by a tab projecting from the rear side of the reservoir, a hook of a carrier, which is fastened to the rear side of the hydraulic block and forms a support for the tab, and a clamp, which connects the tab to the hook with support on the tab.

This hydraulic block offers the advantage that it has a simple configuration with a reduced number of components and attaches easily, rapidly and effectively to the splash wall of the vehicle while it is easily possible to uninstall the brake-fluid reservoir for interventions on the reservoir or for its exchange and to then reinstall it again.

The clamp requires only minimal space in front of the splash wall in order to be brought into an engagement with the tab and the hook, and the front fastening screw is accessible to a screwdriver tool. Otherwise, the reservoir is mounted from the direction of the topside of the hydraulic block, which does not pose any difficulties and makes it possible to visually control the precise mounting.

The fastening apparatus/device (arrangement) that are part of the reservoir are the aforementioned parts, which does not complicate the formation of the reservoir. The carrier on the rear side is a piece that has multiple functions, which thus facilitates the cost-effective production and the installation while a certain acoustic decoupling is realized with the aid of the carrier produced from a plastic material, which is inserted between the plate and the hydraulic block.

According to another advantageous feature, the carrier made of a rectangular body provided with an opening for the fastening to the rear side of the hydraulic block is configured around the passageway of the control rod of the brake, and at the upper section is equipped with the hook, the upper side of which forms the support for the tab of the reservoir.

This form of the carrier, which is adapted to the hydraulic block on the one side and to the lid on the other, thus realizes an excellent interface without interfering with the installation of the hydraulic block on the splash wall.

According to another advantageous feature, the back of the carrier is provided with positioning pegs in order to reach into positioning receptacles of the rear side of the hydraulic block, and with fastening rings, which are integrated into the body, this carrier being combined with a plate, which is provided with an opening that corresponds to the passageway of the control rod, and bores, which correspond to the fastening rings, as well as with lugs for fastening the plate to the splash wall of the vehicle; the plate being placed against the carrier in order to fix the carrier in place on the hydraulic block with the aid of screws, which connect the plate to the rear surface of the hydraulic block, through the rings, in order to block the carrier.

The positioning pegs allow the carrier to be precisely positioned on the rear surface of the hydraulic block, and the fastening rings prevent the plate from compressing the carrier and allowing the plastic material to flow. Therefore, this guarantees the fastening of the plate to the carrier and that of the thereby formed component assembly to the splash wall.

According to another advantageous feature, the tab is a rectangular flat pin whose upper side has a snap-in cavity, which is restricted by a front edge, two side edges and a serrated rear edge.

This simple form facilitates the forming/injection molding, while ensuring the transversal and longitudinal snapping-in of the clamp.

According to another advantageous feature, the body of the carrier has a rectangular form with an edged opening for reaching the contour of the opening of the rear side of the hydraulic block, and is extended in the axis of the control rod of the brake to a frustoconical lid, which forms a cavity that surrounds the entrance of the control rod and its accessory parts into the hydraulic block and accommodates a sleeve fastened to the control rod.

This seemingly complex form of the carrier is nevertheless easy to produce by a molding/injection molding process by configuring the rear section with a frustoconical lid and its collar and the front section (back of the carrier), which is open on account of cavities produced in the thickness of the rectangular body and in the base of the lid.

This is even more interesting as the base of the frustoconical lid advantageously has the shape of a rim which includes a reinforcement, which is partially integrated into the thickness of the rectangular body and forms a support surface for the plate whose contour of the circular opening is supported on this base and on the rear surface of the upper and lower extensions of the body.

According to another advantageous feature, the fastening rings are made of metal and integrated into the carrier made from plastic material, the axial thickness of the rings corresponding to the axial thickness of the carrier. This combination facilitates the fastening of the carrier to the plate while squeezing of the carrier is avoided.

In an advantageous manner, the carrier includes two fastening rings, i.e. one in the upper extension and the other in the lower extension. This makes it possible to ensure the fastening using a minimum of fastening points and rings as well as screws.

According to another feature, the rectangular tab in the form of a flat pin is reinforced by ribs, which are connected to the rear side of the reservoir. This embodiment ensures the firm hold of the hydraulic reservoir on the upper side of the block.

In summary, the hydraulic block of an electrically conductive hydraulic power-assisted brake according to the present invention has the advantage that it has a simple and cost-effective configuration, is made up of a reduced number of components, and allows for easy access to the fastening apparatus/device (arrangement) of the reservoir or the hydraulic block without having to uninstall the hydraulic block or other components of the vehicle in the immediate vicinity of the hydraulic block in the engine compartment.

The fastening apparatus/device (arrangement) of the reservoir on the hydraulic block practically do not interfere with the configuration of the hydraulic block and require only a few internal threads and bores for the positioning of the front fastening apparatus/device (arrangement) and the rear fastening apparatus/device (arrangement), the latter simultaneously forming the apparatus/device (arrangement) for installing the hydraulic block on the splash wall of the vehicle.

In the following text, the present invention will be described in greater detail with the aid of a specific embodiment of a hydraulic block of an electrically conductive hydraulic power-assisted brake, which is illustrated in the appended figures.

BRIEF DESCRIPTION OF THE DRAWINGS

FIG. 4 shows an isometric front view of the brake fluid reservoir.

FIG. 5A shows an isometric view of the carrier of the rear fastening apparatus/device (arrangement) of the reservoir.

DETAILED DESCRIPTION

The present invention has as its subject matter a hydraulic block 1 of an electrohydraulic power-assisted brake including a reservoir 2, which is fastened to the upper side of the hydraulic block in a detachable manner in order to supply the block with brake fluid, which controls the brake circuit as a function of the brake demand.

Figure 1:
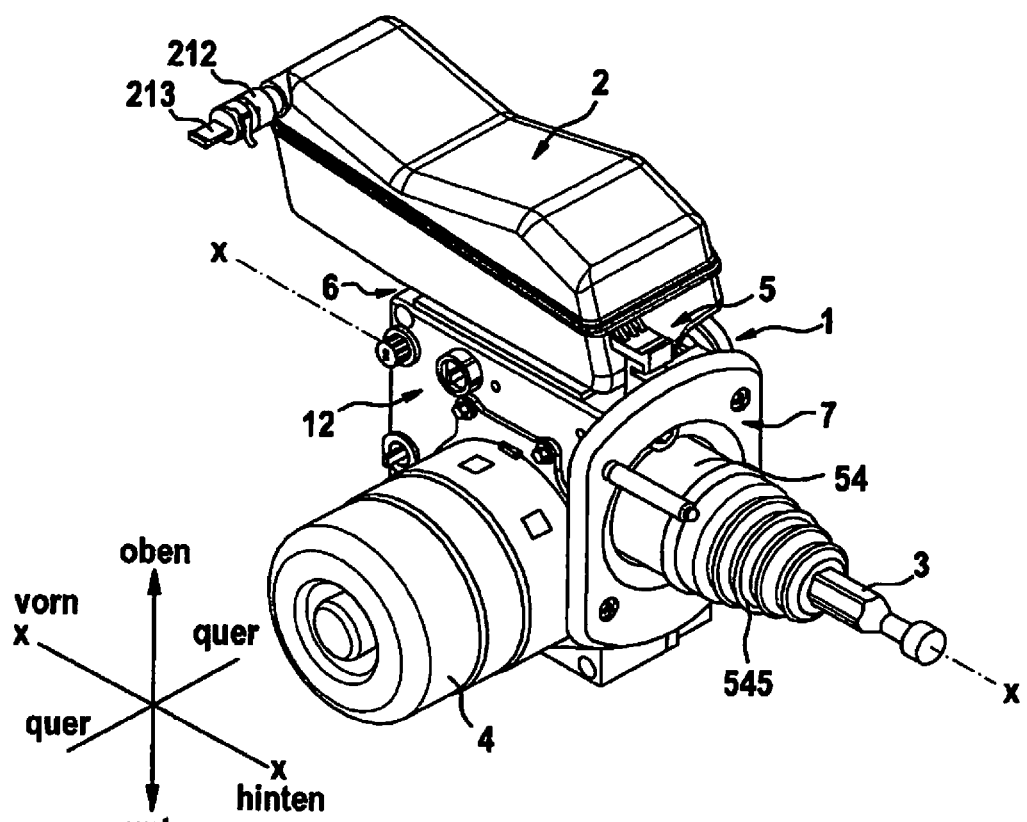
FIG. 1 shows an isometric rear view of the electrically conductive hydraulic power-assisted brake.

According to the standard, the stated orientations "front", "rear", "upper" and "lower" relate to information pertaining to the installation position of the hydraulic block in the vehicle, which is characterized according to the axes shown in FIG. 1.

Figure 2:
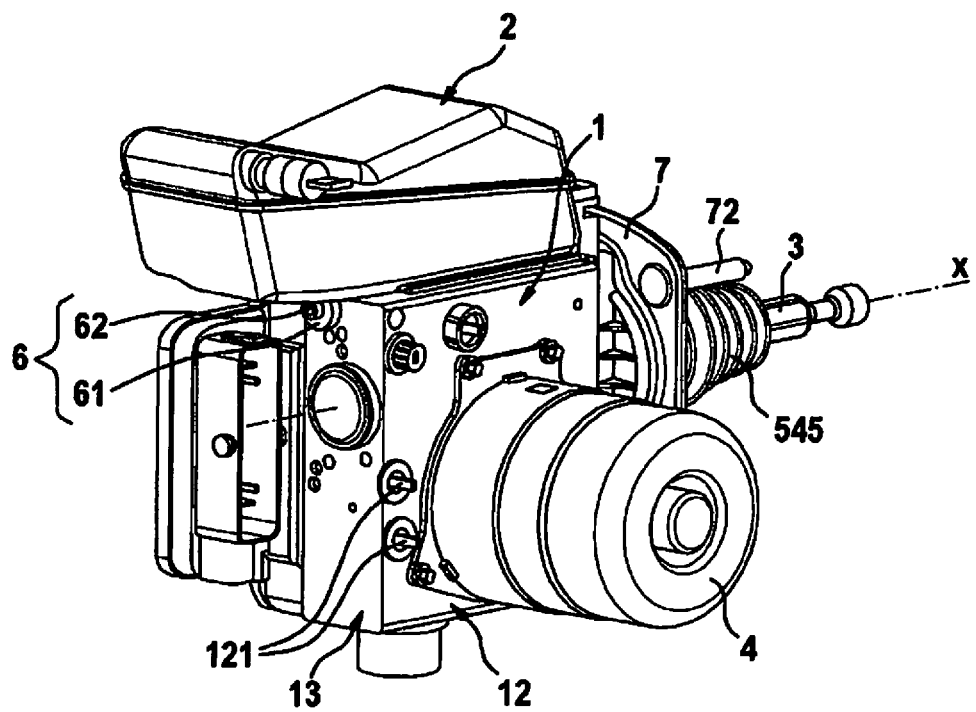
FIG. 2 shows an isometric front view of the electrohydraulic power-assisted brake.
Figure 3:
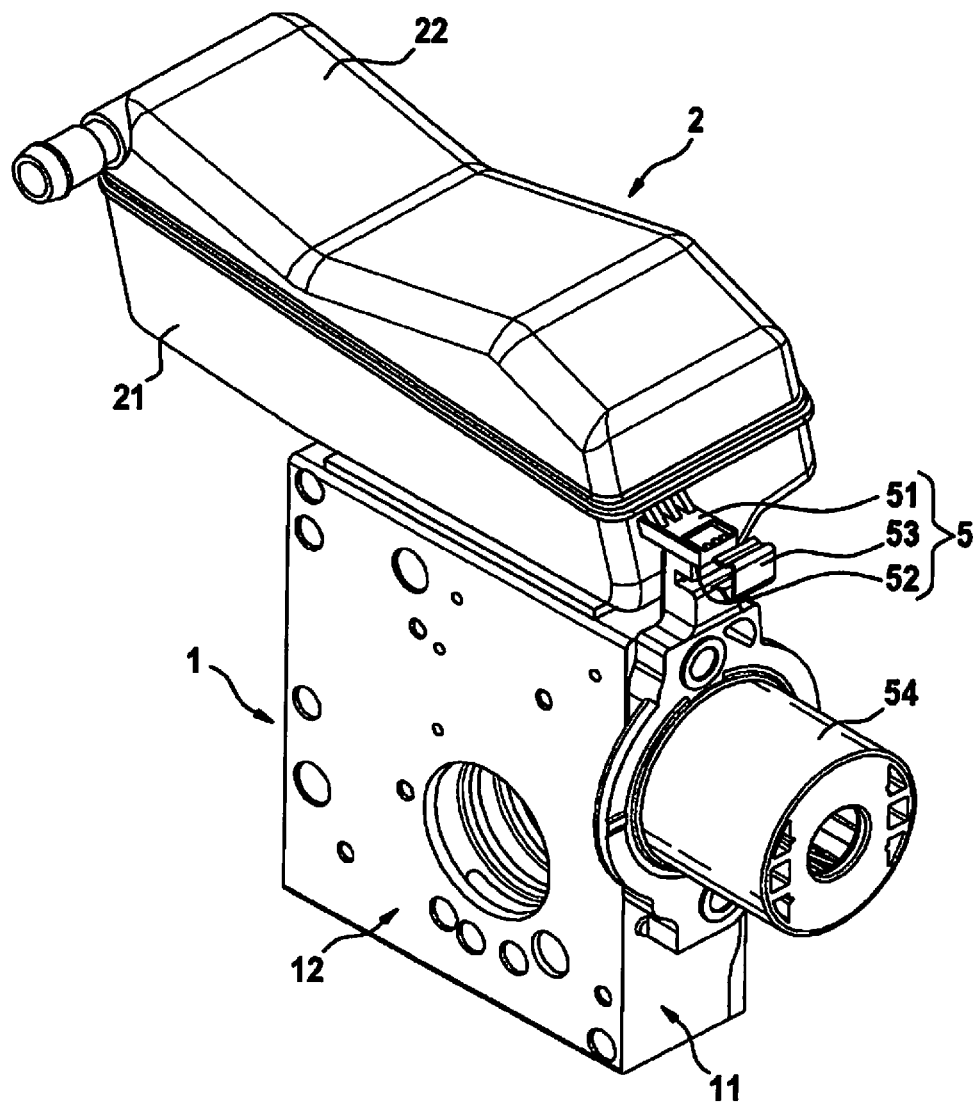
FIG. 3 shows an isometric rear view of the hydraulic block and the reservoir.

According to FIGS. 1, 2 and 3, hydraulic block 1 is a parallelepiped component whose rear side 11, which faces the brake pedal, is attached to the splash wall which separates the engine compartment and the passenger compartment of the vehicle that is traversed by control rod 3 which is connected to the brake pedal.

Block 1 carries its electric motor 4 on a transverse side 12, and it carries brake-fluid reservoir 2 on upper side 14. Side 12 also has branches 121 of the brake circuits.

Upper side 14 (FIG. 6A) has three supply connections 141, which accommodate connectors 215 of the base of reservoir 2 for the exchange of brake fluid between block 1 and reservoir 2. Reservoir 2 has a filler pipe 212, which is sealed by a plug 213. Hydraulic block 1 has a function that is comparable to that of a tandem master cylinder.

Reservoir 2 is made up of two sections configured from a plastic material, i.e. a lower section in the form of a trough 21, which is joined in connection plane 23 to an upper section in the form of a lid 22, the upper side of which has a rippled configuration.

Base 211 of trough 21 (FIG. 4) is provided with three connectors 215, which lock into place in the three supply connections 141 of upper side 14 of hydraulic block 1 by being joined in a tight manner with respect to the outer side. The length of reservoir 2 exceeds that of hydraulic block 1 so that rear side 214 of reservoir 2 and its base 211 are provided with fastening apparatus/device (arrangement) 5, 6 beyond the length of block 1 for fastening reservoir 2 to front surface 13 and rear surface 11 of hydraulic block 1.

Figure 2A:
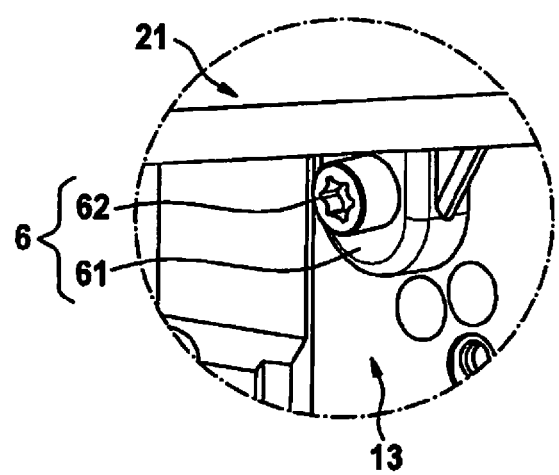
FIG. 2A shows an isometric view of the detail apparatus/device (arrangement) of the front fastening apparatus/device (arrangement) of the hydraulic fluid reservoir.

Front fastening apparatus/device (arrangement) 6 (FIG. 2A) is formed by a tab 61 perpendicular to base 211 of reservoir 2, which slopes in front of front surface 13 of block 1 in order to be connected thereto with the aid of a screw 62, which is accommodated in an internal thread of front surface 13.

Figure 7:
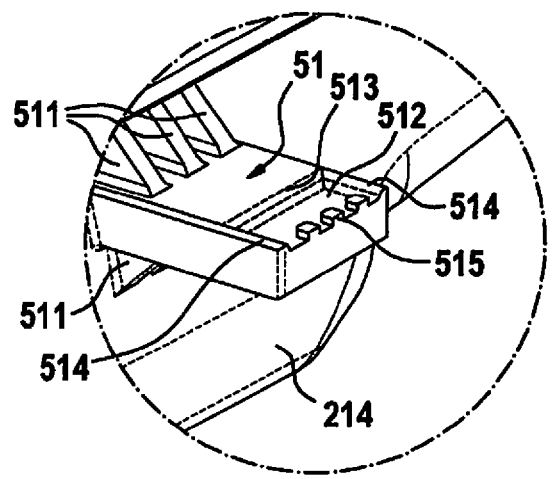
FIG. 7 shows a detail view of the tab of the rear fastening apparatus/device (arrangement), which is a part of the reservoir.

Rear fastening apparatus/device (arrangement) 5 (FIG. 7) is made up of a tab 51, projecting at a right angle, on rear side 214 of reservoir 2, which is joined by a clamp 53 to a hook 525 of a carrier 52, which is fixed in place on rear side 11 of hydraulic block 1.

This configuration of fastening apparatus/device (arrangement) 5, 6 of reservoir 2 takes into account the accessibility of front surface 13 of block 1 when the block is installed in the vehicle, the rear surface 11 near the splash wall being difficult to reach with a screwdriver tool.

Rear fastening apparatus/device (arrangement) 5, which is made up of tab 51, hook 525 and piece 53, is a component assembly that is easy to realize and to open. Clamp 53 simultaneously ensures the compression of the component assembly and guarantees the tightness of the fluid connection through the interlaced configuration between reservoir 2 and hydraulic block 1.

Tab 51 (FIG. 7) is a rectangular flat pin, which projects from rear side 214 of trough 21 and is reinforced there in the sense of the stiffness of its connection by reinforcing panels 511 on the upper side and the underside with the seam to rear side 214 of reservoir 2.

Tab 51 includes on its upper side, near the free end, a snap-in cavity 512 having a rectangular form and a front edge 513, two side edges 514 and a serrated rear edge 515, which facilitates the control of the mounting of clamp 53 in cavity 512.

Figure 5B:
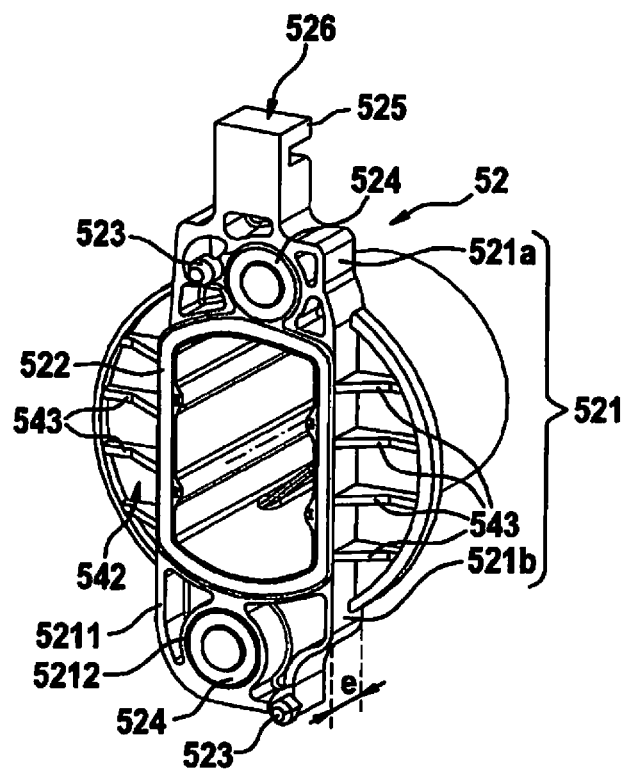
FIG. 5B shows an isometric front view of the carrier from FIG. 5A.

The complementary section of this tab 51 of rear fastening apparatus/device (arrangement) 5 is a carrier 52, which is provided with a hook 525 that is shown in detail in FIGS. 5A, 5B. Carrier 52 is configured from a rectangular body 521 (FIG. 5B) which has a width that is essentially equal to that of rear side 11 of block 1, and a length (height) that is greater than that of the opening (not shown) of rear surface 11 which lets control rod 3 and the equipment allocated to it (shift detector, etc.) pass through.

Rectangular body 521 has an edged opening 522 in order to reach the contour of the opening of side 11 in that a cylindrical cavity 522a (FIG. 5B) is formed, which is oriented according to axis XX of block 1.

Body 521 has an upper extension on both sides of this opening/this cavity 522a and a lower extension 521a, 521b, which is provided on its back (which is its front surface according to the general orientation) with two positioning pins 523 and fastening rings 524.

Body 521 is a piece made of a plastic material having a certain thickness (e) in direction xx, which is formed by a circumferential wall 5211 and reinforcement ribs 5212. The two fastening rings 524 are cylindrical rings made of steel, which have thickness (e) of body 521 and are integrated into it by molding with the aid of an injection molding process.

Upper extension 521a, which is symmetrical with lower extension 521b, differs therefrom by hook 525. More precisely, according to FIGS. 7, 8A, 8B, hook 525 has a height such that its upper surface forms a support 526 for the accommodation of tab 51 in the installed position of reservoir 2. Hook 525, which is the complementary piece of tab 51 for accommodating clamp 53 of rear fastening apparatus/device (arrangement) 5, is configured with tab 51 so that the underside of reservoir 2 is under compression with the upper side of block 1. Hook 525 has an underside that is laterally edged by reliefs 5251 for the transverse retainment of clamp 53.

Figure 8A:
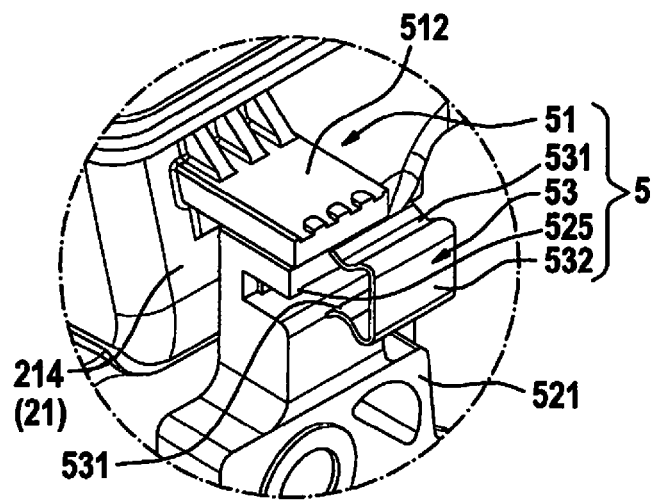
FIG. 8A shows an isometric view of the rear fastening apparatus/device (arrangement) prior to and following the mounting of the clamp of this fastening apparatus/device (arrangement).

FIG. 8A shows the special form of clamp 53, which is a spring steel strip having an Ω-cross-section whose brackets 531 open up in order to facilitate the passage at rear edge 515 of cavity 512 (FIG. 7) and at the not denoted rear edge of the underside of hook 525, the bulbous section 532 covering these edges.

Figure 8B:
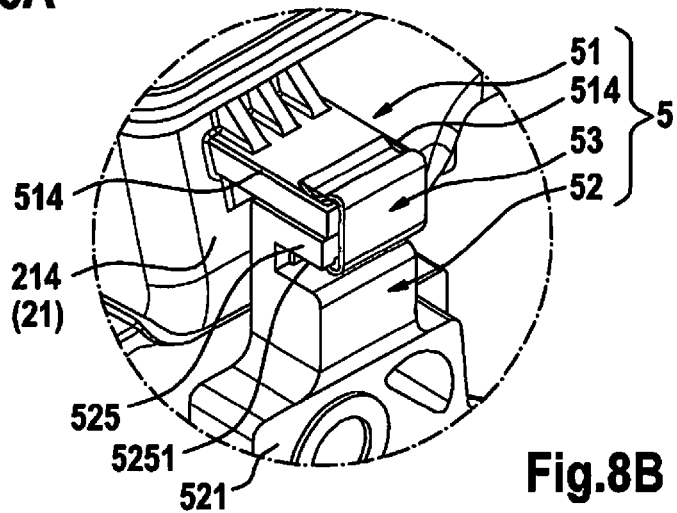
FIG. 8B shows an isometric view of the rear fastening apparatus/device (arrangement) prior to and following the mounting of the clamp of this fastening apparatus/device (arrangement).

The blocking of clamp 53 between the lateral edges 514 and 5251 avoids any displacement of clamp 53 under the effect of the vibrations and shocks, as illustrated in FIG. 8B.

Body 521 of the carrier carries frustoconical lid 54 in a fixedly connected manner, which surrounds cylindrical cavity 522a and is provided with an axial opening 541 on the front side for the passage of control rod 3 and its supplementary parts.

Base 542 of the frustoconical lid is formed by a reinforcement rim, which is partially integrated into the thickness of rectangular body 521 (FIG. 5B). Its thickness has reinforcement ribs 543, which are visible on the back.

Frustoconical lid 54 has a cross-section that is suitable for accommodating the various equipment that surrounds control rod 3 at the connection of control rod 3 to hydraulic block 1. These are sensors and other devices, which are not described in detail here, are mounted on the hydraulic block and elevated at rear surface 11 around axis xx of control rod 3 in order to detect its movement and to supply electrical signals that represent the brake request (intensity, speed). Frustoconical lid 54 accommodates sleeve 545, which surrounds control rod 3 (FIG. 1).

Figure 5C:
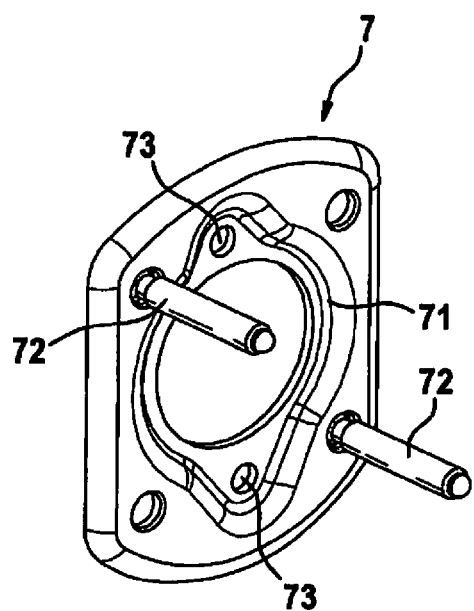
FIG. 5C shows an isometric view of the plate, which is used for mounting the hydraulic block to the splash wall.

Carrier 52 is fixed in place on hydraulic block 1 by a plate 7 (FIG. 5C), which is used to attach component assembly 1, 2 to the splash wall of the vehicle.

Figure 6A:
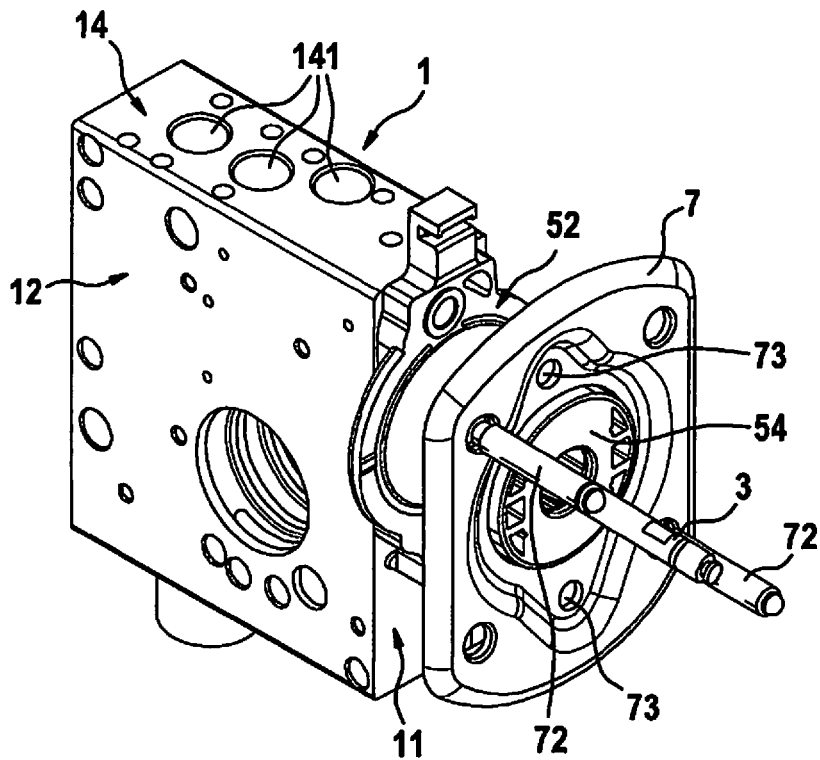
FIG. 6A shows an isometric view of the hydraulic block and the affixation of the plate on the carrier, in particular, showing the start of the positioning of the plate on the rear surface of the carrier, which itself is placed against the hydraulic block.
Figure 6B:
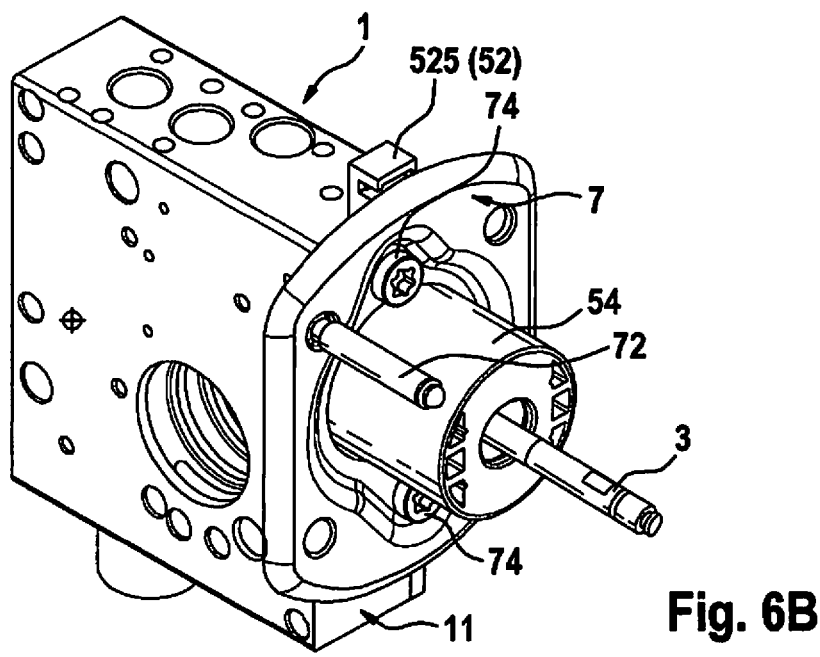
FIG. 6B shows an isometric view of the hydraulic block and the affixation of the plate on the carrier, in particular, showing the same isometric view of the plate, which is fastened to the hydraulic block with the carrier being inserted.

Plate 7 is a rectangular metal plate having a circular opening 71 for covering lid 54 and for supporting itself on the rear surface of body 521 of the carrier and rim 542. Plate 7 carries two or four threaded lugs 72 for its attachment to the splash wall, and two bores 73, which match fastening rings 524 of carrier 52 in order to accommodate a fastening screw 74, which mounts carrier 52 through plate 7 on rear surface 11 of block 1, as illustrated in FIGS. 6A, 6B.

After plate 7 has been fixed in place on block 1, reservoir 2 is mounted on block 1 with the aid of its fastening apparatus/device (arrangement) 5, 6 and the component assembly (1, 2, 7) is then attached to the splash wall. Reservoir 2 is able to be fixed in place on block 1 even after the block has been attached to the splash wall.

| NOMENCLATURE | | | |
|---|---|---|---|
| 1 | | | hydraulic block |
| | 11 | | rear side |
| | 12 | | transverse side |
| | 13 | | front side |
| | 14 | | underside |
| | | 141 | supply connection |
| 2 | | | brake-fluid reservoir |
| | 21 | | trough/lower section |
| | 211 | | base |
| | 212 | | filler pipe |
| | 213 | | plug |
| | 214 | | rear side |
| | 215 | | connector |
| | 22 | | lid |
| | | 221 | filler pipe |
| | 23 | | connection plane |
| 3 | | | control rod |
| 4 | | | electric motor |
| 5 | | | rear fastening apparatus/device |
| | 51 | | tab |
| | | 511 | reinforcing panel |
| | | 512 | snap-in cavity |
| | | 513 | front edge |
| | | 514 | side edge |
| | | 515 | serrated rear edge |
| | 52 | | carrier |
| | | 521 | rectangular body |
| | | 521a | upper extension |

NOMENCLATURE

| | | |
|---|---|---|
| | 521b | lower extension |
| | 5211 | circumferential section |
| | 5212 | rib |
| | 522 | opening |
| | 522a | cylindrical cavity |
| | 523 | positioning peg |
| | 524 | fastening ring |
| | 525 | hook |
| | 5251 | relief |
| | 526 | support |
| 53 | | clamp |
| | 531 | open end |
| | 532 | bulbous section |
| 54 | | frustoconical lid |
| | 541 | axial opening |
| | 542 | base of the lid/reinforcement rim |
| | 543 | rib |
| | 545 | sleeve |
| 6 | | front fastening apparatus/device |
| | 61 | tab |
| | 62 | screw |
| 7 | | plate |
| | 71 | circular opening |
| | 72 | threaded lug |
| | 73 | bore |
| | 74 | fastening screw |

What is claimed is:

1. A hydraulic block apparatus of an electrohydraulic power-assisted brake, comprising:
   a hydraulic block, the upper side of which includes a brake-fluid reservoir, which is fixed in place on the front surface and the rear surface of the hydraulic block in a removable manner with a front fastening arrangement and a rear fastening arrangement;
   wherein the front fastening arrangement is formed by a tab that projects from the underside of the brake-fluid reservoir, the tab being fastened to the front surface of the hydraulic block by a screw, and
   wherein the rear fastening arrangement is formed by a tab projecting from the rear side of the reservoir, a hook of a carrier, which is fastened to the rear side of the hydraulic block and forms a support for the tab, and a clamp, which connects the tab to the hook with support on the tab.

2. The hydraulic block of claim 1, wherein the carrier, made up of a rectangular body provided with an opening for the fastening to the rear side of the hydraulic block, is configured around the passageway of the control rod of the brake, and at the upper section is equipped with the hook, the upper side of which forms the support for the tab of the reservoir.

3. The hydraulic block of claim 2, wherein the back of the carrier includes positioning pegs to reach into positioning receptacles of the rear side of the hydraulic block, and with fastening rings, which are integrated into the body, this carrier being combined with a plate, which is provided with an opening that corresponds to the passageway of the control rod, and bores, which correspond to the fastening rings, as well as with lugs for fastening the plate to the splash wall of the vehicle; the plate is placed against the carrier to fix the carrier in place on the hydraulic block with screws, which connect the plate to the rear surface of the hydraulic block, through the rings, to block the carrier.

4. The hydraulic block of claim 1, wherein the tab includes a rectangular flat pin whose upper side has a snap-in cavity which is restricted by a front edge, two side edges and a serrated rear edge.

5. The hydraulic block of claim 2, wherein the body of the carrier has a rectangular form with an edged opening for reaching the contour of the opening of the rear side of the hydraulic block and is extended in the axis of the control rod of the brake to a frustoconical lid, which forms a cavity that surrounds the entrance of the control rod and its accessory parts into the hydraulic block and accommodates a sleeve fastened on the control rod.

6. The hydraulic block of claim 5, wherein the base of the frustoconical lid includes a base in the form of a reinforcement rim, which is partially integrated into the thickness of the rectangular body and forms a support surface for the plate whose contour of the circular opening is supported on this base and on the rear surface of the upper and longer extensions of the body.

7. The hydraulic block of claim 3, wherein the fastening rings are metal rings, which are integrated into the carrier made of plastic material, and the axial thickness of the rings corresponds to the axial thickness of the carrier.

8. The hydraulic block of claim 4, wherein the rectangular tab, which is in the form of a flat pin, is reinforced by ribs, which are connected to the rear side of the reservoir.

9. The hydraulic block of claim 3, wherein the carrier has two fastening rings, including one in the upper extension and another in the lower extension.

* * * * *